US011469816B2

(12) United States Patent
Jostmeier et al.

(10) Patent No.: US 11,469,816 B2
(45) Date of Patent: Oct. 11, 2022

(54) DISTRIBUTED SENSING APPARATUS

(71) Applicant: LUNA INNOVATIONS GERMANY GMBH, Cologne (DE)

(72) Inventors: Thorben Jostmeier, Cologne (DE); Benjamin Marx, Cologne (DE); Alexander Rath, Cologne (DE); Wieland Hill, Cologne (DE)

(73) Assignee: LUNA INNOVATIONS GERMANY GMBH, Cologne (DE)

( * ) Notice: Subject to any disclaimer, the term of this patent is extended or adjusted under 35 U.S.C. 154(b) by 0 days.

(21) Appl. No.: 17/281,658

(22) PCT Filed: Oct. 2, 2019

(86) PCT No.: PCT/EP2019/076777
§ 371 (c)(1),
(2) Date: Mar. 31, 2021

(87) PCT Pub. No.: WO2020/070229
PCT Pub. Date: Apr. 9, 2020

(65) Prior Publication Data
US 2022/0006520 A1    Jan. 6, 2022

(30) Foreign Application Priority Data

Oct. 3, 2018  (DE) ............... 10 2018 124 435.5

(51) Int. Cl.
*H04B 10/07* (2013.01)
*H04B 10/071* (2013.01)
*G01D 5/353* (2006.01)

(52) U.S. Cl.
CPC ....... *H04B 10/071* (2013.01); *G01D 5/35358* (2013.01)

(58) Field of Classification Search
CPC ... H04B 10/07; H04B 10/071; G01D 5/35358
See application file for complete search history.

(56) References Cited

U.S. PATENT DOCUMENTS 9,541,425 B2    1/2017  Farhadiroushan et al.
2009/0114386 A1  5/2009  Hartog et al.
(Continued)

FOREIGN PATENT DOCUMENTS

DE    102015114670 A1    3/2017
EP       2816323 A1    12/2014
(Continued)

OTHER PUBLICATIONS

International Search Report and Written Opinion (Forms PCT/ISA/210 and PCT/ISA/237) dated Jan. 3, 2020, by the International Searching Authority in corresponding International Application No. PCT/EP2019/076777. (14 pages).
Search Report dated Jun. 20, 2019, by the the German Patent and Trade Mark Office in corresponding German Application No. 10 2018 124 435.5, (11 pages).
(Continued)

*Primary Examiner* — Dzung D Tran
(74) *Attorney, Agent, or Firm* — Buchanan Ingersoll & Rooney P.C.

(57) ABSTRACT

A distributed sensing apparatus based on Optical Time Domain Reflectometry, OTDR, including an optical source; an optical splitter in optical communication with the optical source, the optical splitter having first and second outputs; a sensing fibre in optical communication with the first output of the optical splitter; a combining unit arranged to combine a reference signal derived from the second output of the optical splitter with a backscattered signal derived from the sensing fibre, wherein the combining unit comprises one or more 3×3 fused fibre couplers; and a signal processing unit configured for processing information derived from the combining unit so as to provide distributed sensing data. The combining unit includes a polarization diversity arrangement including one or more polarization sensitive elements.

20 Claims, 5 Drawing Sheets

(56) References Cited

U.S. PATENT DOCUMENTS

| | | | |
|---|---|---|---|
| 2012/0067118 A1* | 3/2012 | Hartog | G02B 6/10 |
| | | | 73/152.16 |
| 2014/0255023 A1* | 9/2014 | Kishida | H04B 10/071 |
| | | | 398/21 |
| 2017/0059427 A1 | 3/2017 | Bunse et al. | |
| 2017/0307475 A1* | 10/2017 | Eyal | H04B 10/07 |
| 2018/0094987 A1* | 4/2018 | Iwamura | G01K 11/32 |
| 2020/0249075 A1* | 8/2020 | Ma | G02B 26/04 |

FOREIGN PATENT DOCUMENTS

| | | |
|---|---|---|
| EP | 3232165 A1 | 10/2017 |
| WO | 2012/030814 A2 | 3/2012 |
| WO | 2014/201057 A2 | 12/2014 |
| WO | 2017037453 A1 | 3/2017 |

OTHER PUBLICATIONS

Cameron, C.B. et al. "Asymmetric analogue demodulator for optical fiber interferometric sensors" Proceedings of the 34th Midwest Symposium on Circuits and Systems May 14-17, 1992, Monterey, CA, USA. 1992, pp. 666-671.

Galtarossa, A. et al. "Distributed polarization sensing" Proceedings of SPIE, 25th International Conference on Optical Fiber Sensors, vol. 1032318. 2017, vol. 6 pages.

Reyes-Iglesias, P. J. et al. "Colorless monolithically integrated 120° downconverter" Optics Express (OpEx), vol. 21, 2013, No. 20, pp. 23048-23057.

Todd, M D et al. "Passive, light intensity-independent interferometric method for fibre Bragg grating interrogation" Electronics Letters, vol. 35, 1999, No. 22, pp. 1970-1971.

Zhong, X., "Influences of laser source on phase-sensitivity optical time-domain reflectometer based distributed intrusion sensor" Applied Optics, vol. 53, 2014, No. 21, pp. 4645-4650.

* cited by examiner

DISTRIBUTED SENSING APPARATUS

This invention relates to a distributed sensing apparatus.

Optical Time Domain Reflectometry (OTDR) is a distributed fibre sensing method in which light is injected into a sensing optical fibre and the backscattered light is analysed in order to measure physical quantities in the environment of the fibre. It may be used for measuring temperature, strain, vibration or acoustic fields, as well as for the characterization and monitoring of the sensing fibre (e.g. to localize bending losses or w breaks).

Known OTDR methods include Coherent-OTDR (C-OTDR) and Polarization-OTDR (P-OTDR), which respectively take advantage of the effect that environmental changes have on the phase (C-OTDR) and state of polarization (P-OTDR) of the backscattered light.

Some known OTDR demodulation algorithms for C-OTDR take as input a signal triple which includes signals which are separated in phase by 120°. Appropriate demodulation algorithms based on such signals are known per se to those skilled in the art. Reference is directed for example to M. D. Todd et al, "Passive, light intensity-independent interferometric method for fibre Bragg grating interrogation", Electronics Letters 28 Oct. 1999, Vol. 35 No. 22 and to Charles B. Cameron et al, "A Symmetric Analogue Demodulator for Optical Fiber Interferometric Sensors", [1991] Proceedings of the 34th Midwest Symposium on Circuits and Systems.

The present specification provides a distributed sensing apparatus based on Optical Time Domain Reflectometry (OTDR) or Optical Frequency Domain Reflectometry (OFDR). The apparatus comprises an optical source; an optical splitter in optical communication with the optical source, the optical splitter having first and second outputs; a sensing fibre in optical communication with the first output of the optical splitter, and a combining unit arranged to combine a reference signal derived from the second output of the optical splitter with a backscattered signal derived from the sensing fibre. The combining unit comprises one or more fused fibre couplers.

The distributed sensing apparatus includes a polarization diversity arrangement comprising one or more polarization sensitive elements. The polarization diversity scheme is configured to align the polarization of a first signal derived from the backscattered signal with a first signal derived from the reference signal. The polarization diversity scheme is further configured to align the polarization of a second signal derived from the backscattered signal with a second signal derived from the reference signal.

The combining unit may comprise at least three outputs. The distributed sensing apparatus may include a signal processing unit which is configured for processing information derived from the at least three outputs so as to provide distributed sensing data. In some implementations the combining unit may comprise six outputs.

In some implementations the one or more fused fibre couplers may comprise a fused fibre coupler having at least three outputs. The fused fibre coupler may be configured to provide a phase shift (e.g. a 120° phase shift) between the second output and the first output of the coupler, and a phase shift (e.g. a 120° phase shift) between the second output and the third output of the coupler. In some implementations the one or more fused fibre couplers may comprise a first fused fibre coupler having three outputs, and a second fused fibre coupler having three outputs. The first fused fibre coupler may be configured to provide a phase shift (e.g. a 120° phase shift) between outputs and the second fused fibre coupler may be configured to provide a phase shift (e.g. a 120° phase shift) between outputs.

It will thus be understood that the combining unit may provide at least one signal triple. In some implementations the combining unit may provide first and second signal triples.

In various embodiments the one or more fused fibre couplers comprise one or more M×N fused fibre couplers. An M×N fused fibre coupler is a fused fibre coupler having M inputs and N outputs. M may be greater than or equal to two and N may be greater than or equal to three.

In some examples the one or more fused fibre couplers comprise one or more 3×3 fused fibre couplers. A 3×3 fused fibre coupler is a fused fiber coupler formed to have three inputs and three outputs. In some implementations not all of the inputs of a 3×3 fused fibre coupler may be used, for example in some implementations described herein only two of the inputs of a 3×3 fused fibre coupler are actually used.

In some implementations an M×N fused fiber coupler may be employed having more than three outputs, for example six outputs (i.e. N is equal to six), with a 60° phase shift between outputs.

In various embodiments the combining unit is configured to provide first and second signal triples, wherein the first signal triple is formed by superposition of the first signal derived from the backscattered signal with the first signal derived from the reference signal, and the second signal triple is formed by superposition of the second signal derived from the backscattered signal with the second signal derived from the reference signal. The signal processing unit may be configured to process information derived from the first and second signal triples so as to provide the distributed sensing data. In the case of C-OTDR, a demodulation algorithm may be carried out separately for each polarization triple and the resulting phase information may be combined (e.g. added). It is also possible that further processing may be performed on the phase data for each polarization (e.g. temporal or spatial smoothing, noise bandwidth filtering or spectral analysis of the time-domain data) and that the results of these processing steps may be combined (e.g. added).

In various embodiments the first and second signal triples, taken together, define three signal pairs, wherein the signals within each pair derive from signals with orthogonal polarizations.

As used herein, the term PM means polarization-maintaining and the term PMF means polarization-maintaining optical fibre. In contrast, the term SMF refers to a single mode optical fibre which is not polarization-maintaining. Similarly, the term SM (single mode) as used herein, e.g. to describe a device such as a coupler or a splitter, means that the device is not polarization maintaining.

As will be understood by those skilled in the art, the term "light" as used herein is not limited to visible light and instead includes any suitable electromagnetic radiation such as infrared light (including near and far infrared light), visible light and ultraviolet light. Similarly the term "optical" as used herein should not be understood as relating to the visible part of the electromagnetic spectrum only and instead relates to light of any suitable wavelength whether visible or not.

So that the invention may be more easily understood, embodiments thereof will now be described with reference to the accompanying drawings, in which.

Note that like reference numbers denote like elements throughout the drawings.

Various implementations described in this specification take advantage of coherent detection for distributed sensing while at the same time avoiding drawbacks such as polarization fading and the influence of strong local oscillator (LO) relative intensity noise (RIN).

Figure 1:
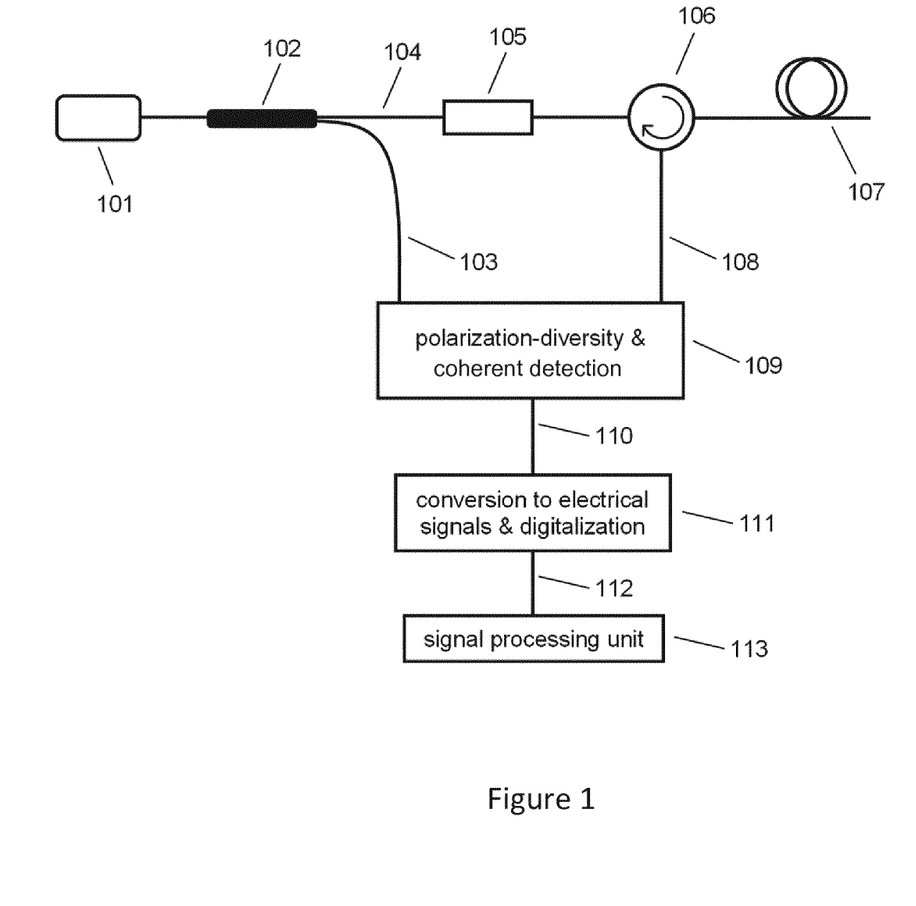
FIG. 1 shows an example distributed sensing apparatus based on Optical Time Domain Reflectometry (OTDR)

An example distributed sensing apparatus based on Optical Time Domain Reflectometry (OTDR) is shown in FIG. 1. As shown the apparatus includes an optical source 101 in the form of a narrow bandwidth source such as a laser, an optical splitter 102, a sensing optical fibre 107, a receiver 109, conversion and digitalisation equipment in for converting the output of the receiver 109 to electrical signals and for digitalising said signals, and a signal processing unit 113. In various embodiments the splitter 102 may comprise a fibre optic splitter.

The implementation of FIG. 1 uses a coherent detection scheme in which the continuous wave (cw) output of the laser source 101 is divided by the optical splitter 102. The splitting ratio may be chosen depending on the output power of the laser 101, the required optical power of the local oscillator signal (LO) 103 and the required optical powers in the upper optical path 104. The light in this path 104 is shaped to form optical pulses by an optical modulator 105. This modulator 105 may optionally introduce a frequency shift. An optical amplifier (not shown) may optionally enhance the pulse power. An optical circulator 106 launches the pulses into the sensing fibre 107 where a small fraction of the forward propagating light pulse is scattered, recaptured and then propagates back.

The backscattered optical signal 108 (B) arrives at the circulator with a delay of, for example, 10 µs/km, and is redirected to the receiver 109. Different example optical schemes for the receiver 109 are described below with reference to FIGS. 2-5 which may be used to achieve polarization-diversity in detection and a superposition of LO and B. In these and various other example implementations the superposition of LO and B in the receiver 109 is achieved using only standard fused fibre optics and in particular one or more fused fibre 3×3 couplers. Such couplers may have splitting ratio of 1:1:1 with a 120° phase shifts between the outputs.

The receiver 109 may have three or six outputs, depending on the optical scheme that is employed, as described in more detail below with reference to FIGS. 1-5. The outputs are represented by line 110 in FIG. 1.

The signals 110 are converted to electrical signals 112 in a time-resolved fashion using conversion and digitalization equipment in. The equipment 111 may include photodiodes, optionally followed by amplifications stages or bandwidth filters. The equipment in further comprises an analogue-to-digital converter (ADCs) for digitalizing the electronic signals.

The number of digital signals 112 that are generated by the conversion and digitalisation equipment 111 may be either three or six, depending on the optical scheme that is employed. These digital signals are depicted as line 112 in FIG. 1

The digital signals 112 are fed into a signal processing unit 113 (e.g. FPGA, CPU or other microprocessors). Here, the distributed sensing of physical quantities in the environment of the sensing fibre 107 is achieved by a careful analysis of the recorded backscatter data. In relation to example implementations based on C-OTDR, suitable demodulation algorithms for providing distributed sensing data based on the received digital signals 112 are known per se to those skilled in the art and will not be described here.

EXAMPLES

As shown in FIG. 1, the OTDR scheme may include a combining unit in the form of receiver 109 which is adapted for polarization diversity and coherent detection.

In describing various example implementations below, the receiver 109 may be referred to as an optical "heterodyne" receiver 109. In doing so it will be understood that the frequencies of the backscattered signal (B) and the LO may be shifted/different or they may be equal. In the latter case, the detection scheme is sometimes referred to as homodyne. However, in the present specification, both options (i.e. with or without a frequency shift) are included in the term heterodyne. Such a detection scheme may alternatively and equivalently be referred to herein as a "coherent detection" scheme.

Figure 2:
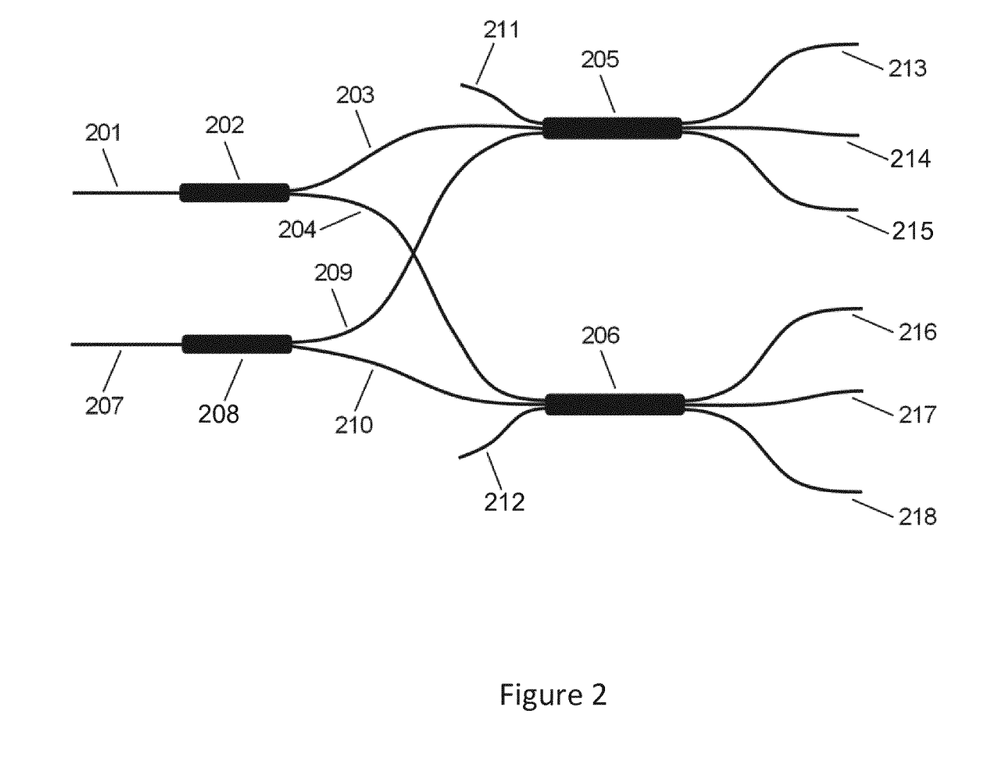
FIG. 2 shows an example of an optical scheme for a heterodyne receiver.

A first embodiment of the optical heterodyne receiver 109 is depicted in FIG. 2. A single mode fibre (SMF) 201 containing the backscattered optical signal (B) 108 is connected to a fibre optic polarizing beam splitter (PBS) 202 that splits B in two polarization components with orthogonal linear state of polarization (SOP) B-1 203 and B-2 204. Since polarization fading causes a varying SOP of B, the optical powers of the polarization component B-1 and the polarization component B-2 are not constant but complementary and reflect the fraction of B that is polarized in parallel to the respective directions of polarization in the PBS. The PBS features two output polarization-maintaining fibres (PMFs) 203 and 204 which contain the components B-1 and B-2, respectively.

In the next step, B-1 is directed to a fused polarization-maintaining (PM) 3×3 coupler 205 and B-2 is directed to a PM fused 3×3 coupler 206. Each coupler functions on one working axis, i.e. light in the other axis of the PMF will not be split with a ratio of 1:1:1 and 120° phase shifts between the outputs. Since 203 and 204 are PMFs, the SOP of B-1 and B-2 does not change during the propagation but is contained to the slow or fast axis of the PMF. The fused 3×3 couplers 205 and 206 are designed to work on the corresponding working axis of the input PMFs 203 and 204.

The LO signal 103 is received in the optical fibre 207 and is directed to a splitting component 208 in order to create two components to be superposed with B-1 and B-2 for heterodyne detection.

Here, two versions should be distinguished. In a first version, a PMF 207 containing the LO signal 103 is connected to an optical PM splitter 208 with a splitting ratio of 1:1. The coupler works on the corresponding working axis of 207. The preferred splitting ratio is 1:1 in order to equally distribute the LO power to the two fused 3×3 couplers. However, other splitting ratios may be chosen. In a second version, 208 is a PBS where the working axis of the input fibre is aligned 45° with respect to the orthogonal directions of polarization of the PBS.

Both versions accomplish the task of splitting the optical power of the LO signal 103 into two signals LO-1 and LO-2 which are each directed to the 3×3 coupler 205 and 206 by the PMFs 209 and 210, respectively. Again, the SOP is retained. Note that the working axis of 203, 204, 209 and 210 are identical, and that the third input ports of the 3×3 couplers 211 and 212 are not used.

Polarization-diversified heterodyne detection is achieved by the superposition of the signal pairs (B-1, LO-1) and (B-2, LO-2) in the 3×3 couplers. In this way, received backscattered light of any arbitrary SOP is superposed with a corresponding part of the LO without a loss of signal strength. For each of the two orthogonal SOPs, three output signals are generated and the total of six output PMFs 213, 214, 215, 216, 217, 218 direct the output signals to the next section 111.

In this document, the six output signals are labelled H-pq, where p=1,2 distinguishes two orthogonal SOPs, and q=1, 2,3 states refers to the three outputs of a 3×3 coupler. The signals triples (H-11,H-12,H-13) and (H-21,H-22,H-23) are each suitable for performing C-OTDR or P-OTDR (demodulation, analysis of SOP change, suppression of RIN as discussed below).

Figure 3:
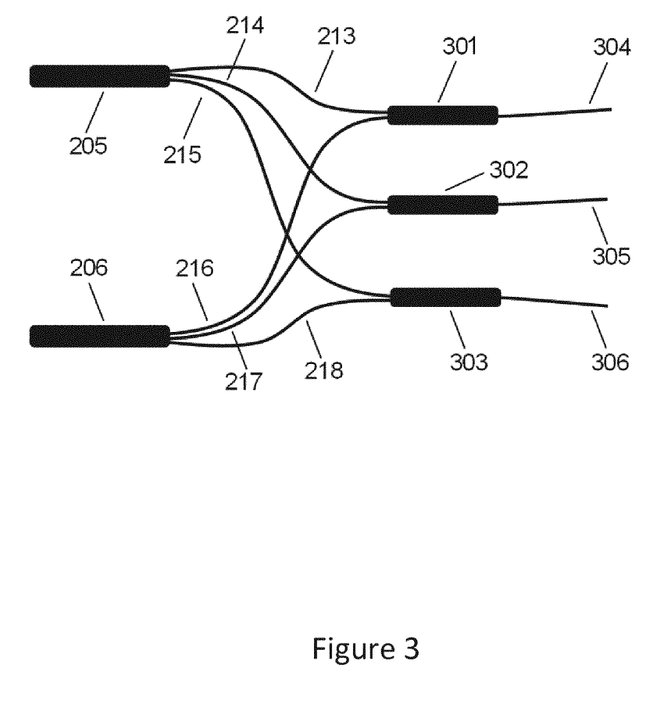
FIG. 3 shows an optional extension to the optical scheme of FIG. 2.

An optional extension to the embodiment of FIG. 2 is shown in FIG. 3. The extension can be used when only the total power of the backscatter signal is of interest for the distributed sensor. In this case, the optical scheme shown in FIG. 3 can be used to reduce the number of optical signals that need to be detected and processed. The optical scheme of FIG. 3 may also be used for suppression of RIN.

The signal pairs (H-11,H-21), (H-12,H-22) and (H-13,H-23) each comprise two signals with orthogonal SOPs but the same phase shift (0°, 120° or 240°). They are each launched into one of the PM PBSs 301,302 or 303 where light entering the PBS in the slow axis of the input PMFs is combined in the output fibres 304, 305 or 306.

Here, two version can be distinguished. In a first version, fibres 304, 305 and 306 are PMFs and each contain one of the signal pairs (H-11,H-21), (H-12,H-22) and (H-13,H-23) with each signal being separately guided in one of the principle axis of the PMF. In a second version, 304, 305 and 306 are SMFs and each contain the vector sum of the two signals in each pair. In both versions, the sum of the two signals is be detected by photodiodes and be used for distributed sensing.

Figure 4:
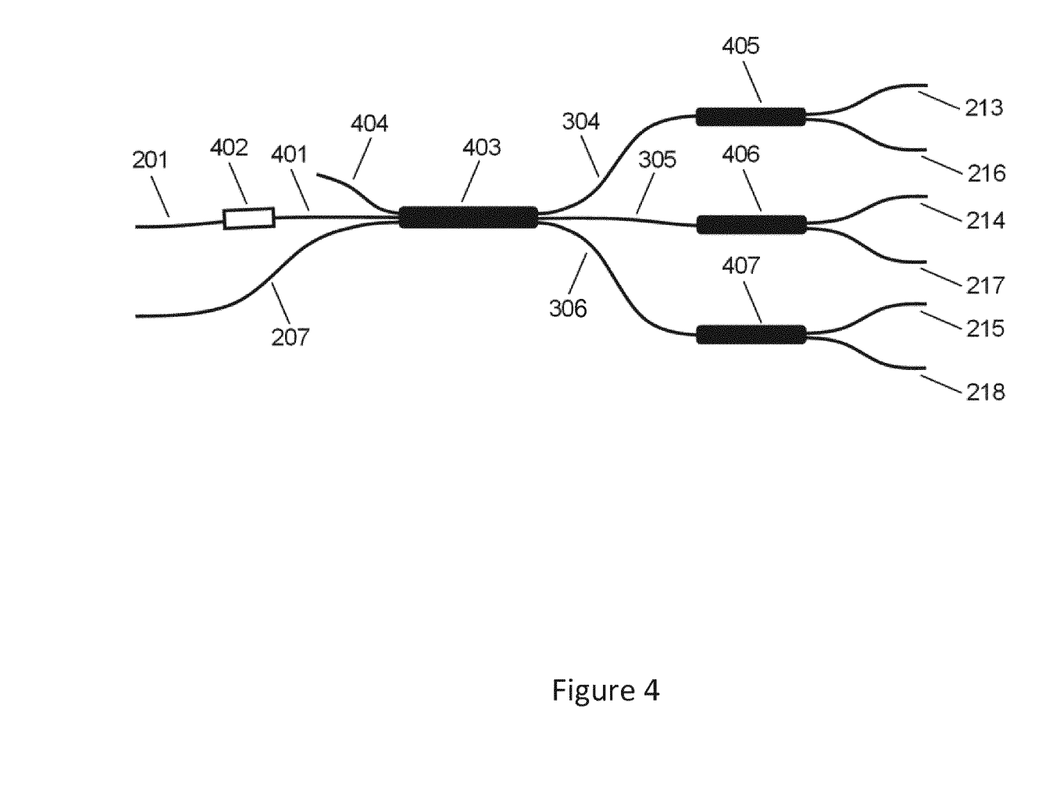
FIG. 4 shows another example of an optical scheme for a heterodyne receiver.

FIG. 4 shows another example of an optical scheme for the optical heterodyne receiver 109. In this example, only one 3×3 coupler 403 is used.

As shown in FIG. 4, the signal B is transmitted from a SMF 201 to a PMF 401 via a splice connection 402. If the SOP in 401 is not aligned perfectly to one of the principal axis of 402, optical power is coupled into both axis of 402. Consequently, the varying SOP of B in 401 is converted into varying power levels in the fast and slow axis of 402. The signals B-1 and B-2 are each guided in one of the axis.

The PMF 207 should contain an equal amount of LO light in both axis, i.e. the signals LO-1 and LO-2. The heterodyning of B and LO is performed in a fused PMF 3×3 coupler 403 which functions on both axis with sufficiently low crosstalk. This means that light in the slow axis of the input fibres is superposed only with light from other slow axis, and vice versa for the fast axis. In essence, this coupler integrates two fused 3×3 couplers into one device. The input port 404 of 403 is unused.

The three output PMFs 304, 305 and 306 each contain one of the signal pairs (H-11, H-21), (H-12, H-22) and (H-13, H-23) where each signal is guided in one of the principle axis of the PMF. In cases where only the total power of B is of interest, the sum of the signals in each pair could be detected.

In the case where both polarization components of B are needed, 304, 305 and 306 are each connected to a PBS 405, 406 or 407. Here, the signal pairs are split and each signal is emitted separately into a principle axis of one of the PMFs 213-218. The six separate signals comprise the polarization-diverse heterodyne detection with one fused fibre 3×3 coupler and can be utilized for distributed sensing as outlined above.

Figure 5:
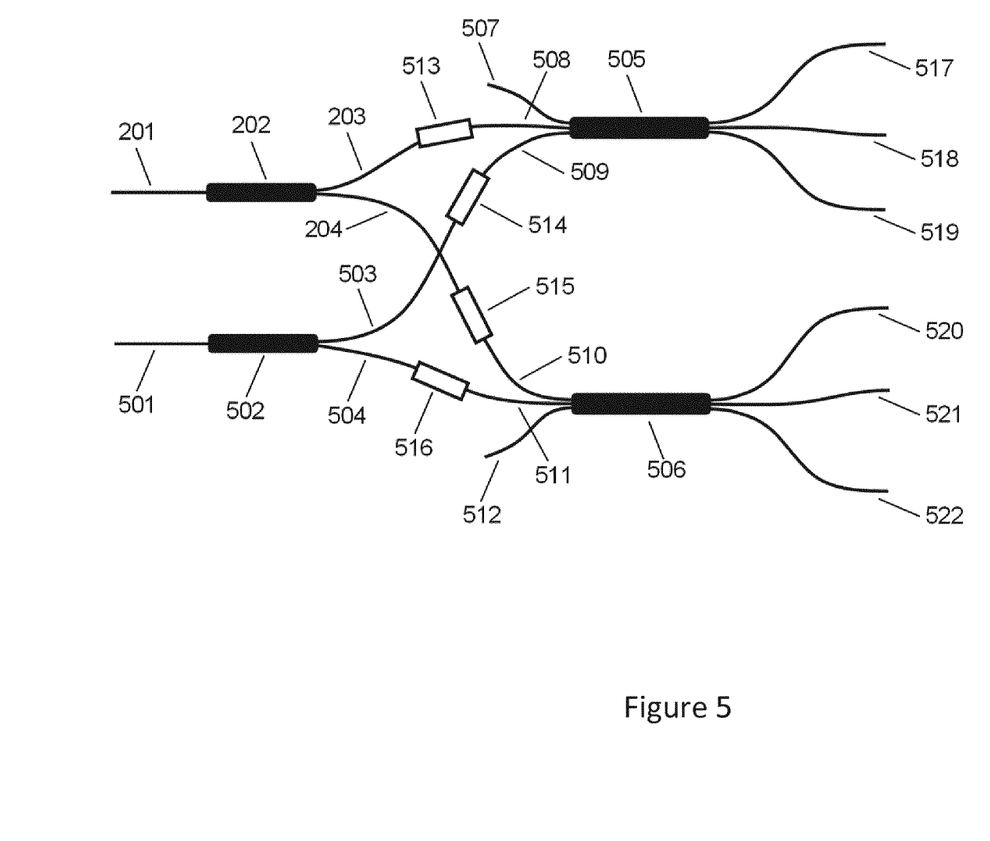
FIG. 5 shows yet another example of an optical scheme for a heterodyne receiver.

FIG. 5 shows another embodiment of the optical heterodyne receiver 109. In this example, fused SMF 3×3 couplers are employed for the heterodyne detection which comes with the benefits of lower costs and a better performance (see below). The splitting of B in two orthogonally polarized signals B-1 and B-2 is done identically to FIG. 2 using the components 201-204.

The LO signal 103 may be split up differently in different versions of this embodiment. In a first version, SMF 501 contains the LO signal 103 which is connected to an optical SM splitter 502. The preferred splitting ratio is 1:1 in order to equally distribute the LO power to the two fused 3×3 couplers. However, other splitting ratios may be chosen. The output of the splitter 502 comprises SMFs 503 and 504. A second and third version are identical to the two different versions of splitting the LO signal 103 presented in the discussion of FIG. 2. In particular, in the second and third versions the fibres 501, 503 and 504 comprise PMFs. In the second version, the splitter 501 comprises a PM splitter. In the third version the splitter 501 comprises a PBS.

All three versions accomplish the task of splitting the optical power of the LO signal 103 into two signal LO-1 and LO-2, which are directed to the fused SMF 3×3 couplers 505, 506. Thus, LO and B are superposed in the fused SMF 3×3 couplers 505 and 506, which comprise SMF inputs 507, 508, 509, 510, 511 and 512 (507 and 512 are unused).

The solution for ensuring the polarization-diverse heterodyning with fused SMF 3×3 couplers 505 and 506 will now be explained by reference to the upper branch of FIG. 5, for coupler 505. The procedure analogously applies to the lower branch connected to coupler 506. The PMF 203 is connected to the SMF 508 via a component 513 which comprises a splice transition from PMF to SMF. In 508, birefringence could potentially change the SOP of B-1 during the propagation to 505 and lead to an undefined SOP of B-1 in 505. However, the SOP will not vary as long as environmental influences do not disturb the setup. The signal LO-1, which is to be superposed with B-1, is transmitted via the component 514 to the SMF 509. In the second and third versions of the optical scheme (see above), a component 514 may also be provided which comprises a splice transition from PMF to SMF. Again the SOP of LO-1 in 505 may be undefined but fixed.

In order to assure parallel polarizations of B-1 and LO-1, the component 513 and/or 514 may further comprise a device or arrangement to control the SOP of the propagating light, herein referred to as Polarization Controller PC. Using a PC in either 513 or 514, the SOPs of B-1 and LO-1 can be matched to gain the maximum possible heterodyning effect, i.e. to maximise the right-hand term in Equation (1) below by adjusting θ to zero. In should be stressed that without any PC, the strength of the homodyne signals triples (H-11, H-12,H-13) and (H-21,H-22,H-23) is determined by the arbitrary directions of polarizations of the four signals in 505 and 506, respectively. Depending on each specific configuration, individual different units of the same embodiment will perform differently. The strength of the heterodyne signals might vanish and render the distributed sensing impossible.

Example of PC which could be used include, but are not limited to manual polarization controllers, e.g. manual polarization controllers in which a bare fibre or jacket fibre is exposed to pressure and rotation. This kind of PC could very well be a self-made device which is capable of rotating 508 behind 513, or 203 before 513, or rotating the splice transition within 513. Alternatively or in addition, a rotatable in-line polarizer could be employed to function as the PC and the splice transition combined. Electronically or thermally controlled PC are also possible.

In total, two of the four components 513-516, including each one of the pairs (513,514) and (515,516) may include a PC for an optical polarization-diversity and homodyne detection with fused SMF 3×3 couplers. The six output signals H-pq are contained in the SMFs 517-522.

It is noticed that by analogy to the embodiment presented in FIG. 3 an extension to the presented embodiment FIG. 5 can be made if only the total power of B is of interest for the data processing. In this case, the optical setup shown in FIG. 3 may be modified due to the SMF outputs 517-522 and the consequential SMF-PMF transition into the inputs fibres of 301-303. Adding another component 513-516 in each input leg of 301-303 offers the opportunity to adjust the SOP in 517-522 in order to launch all six output signals of 505 and 506 into the appropriate principle polarization axis of 301-303. Thereby, the functionality of the extension in FIG. 3 can be applied to the embodiment FIG. 5 based on fused SMF 3×3 couplers.

SUMMARY OF EXAMPLES

As will be understood from the foregoing, various embodiments provide a passive polarization-diversity scheme based on fused fibre-optical components, while at the same time using at least one fused 3×3 coupler to perform heterodyne detection. This solves the problem of polarization fading without the need for multiple interrogation pulses.

Thus, various embodiments provide polarization-diversity detection in combination with heterodyne detection using at least one SM or PM fused 3×3 coupler, standard low-cost fibre optic components and only single-ended detection channels. To this end, the embodiments offer different solutions for generating appropriate components of B and LO and matching the state-of-polarization (SOP) of B and LO during superposition in fused 3×3 couplers.

Various implementations can be applied in particular, but not exclusively, to distributed acoustic sensing (DAS) where acoustical or vibrational perturbations in the vicinity of the sensing fibre are monitored and characterized in magnitude and frequency. Benefits relating to DAS arise because the heterodyne output signals of 3×3 couplers are beneficial for demodulation schemes and for the unambiguous determination of the frequency of acoustic perturbations. A frequently employed utilization of DAS systems is the distributed sensing of acoustic or vibrational perturbations for applications such as the monitoring of pipelines, boreholes, power cables, roads or railways, or the surveillance of assets or borders.

Various embodiments are furthermore applicable for the purpose of monitoring temperature, strain or the condition of an optical fibre by analysing the backscattered intensity only or the state of polarization (SOP) of the backscattered light or a combination of both. In some embodiments, polarimetric analysis may be used for measuring birefringence induced by magnetic fields, stress, bending or torsion. Reference is directed to A. Galtarossa and L. Palmieri, OFS-25, SPIE paper 10323-564, 2017.

Various embodiments apply to classical OTDR or Polarization-OTDR where the information required to measure the desired quantity is contained either in the total backscattered signal power or in multiple separately detected backscattering powers for different polarizations (note that where it is not necessary to have information about the phase, no demodulation necessary). In the case where the total backscattered power is sufficient, modified embodiments of the proposed schemes can be employed where only three signals need to be detected, digitized and processed, thus saving resources in electronics and data processing, while ensuring passive polarization-diversity detection.

Moreover, various implementations provide signals that are unique to 3×3 couplers to effectively remove laser RIN from the detected signals. In contrast to balanced receivers, the RIN may be removed in the digital data processing by combining three suitable output signals of the 3×3 couplers.

REFERENCE NUMBERS

For ease of reference, a list of reference signs used in FIGS. 1-5 is provided below together with a brief description of the elements that they denote:

101—light source (e.g. laser such as a narrow bandwidth laser for C-OTDR)
102—fibre optical splitter
103—local oscillator
104—second optical path
105—optical modulator for pulse shaping and amplification
106—optical circulator
107—sensing fibre
108—backscattered light from the sensing fibre
109—optical heterodyne receiver with polarization diversity, based on fused fibre 3×3 couplers
110—optical output signals of 109, summarized as one line, could be three or six signals
111—conversion to electrical signals & digitalization
112—digital signals, summarized as one line, could be three or six signals
113—signal processing unit
201—backscattered light from sensing fibre (108 in FIG. 1), SMF
202—fibre optical Polarizing Beam Splitter (PBS)
203—PMF containing B-1
204—PMF containing B-2
205, 206—fibre optical fused PMF 3×3 coupler
207—PMF containing the LO
208—Version 1: optical PM splitter, Version 2: PBS
209—PMF containing LO-1
210—PMF containing LO-2
211—unused input port of 205
212—unused input port of 206
213—PMF containing output signal H-11.
214—PMF containing output signal H-12
215—PMF containing output signal H-13
216—PMF containing output signal H-21
217—PMF containing output signal H-22
218—PMF containing output signal H-23
301—PBS combining signals from 213 and 216
302—PBS combining signals from 214 and 217
303—PBS combining signals from 215 and 218
304-306—Version 1: PMF, Version 2: SMF
401—PMF connecting 402 and 403
402—splice connection between 201 and 4001

403—fibre optical fused PMF 3×3 coupler working on both axis
404—unused input port of 403
405-407—PBS
501—fibre containing the LO. Versions: SMF, Version 2 and Version 3: PMF
502—optical component for splitting the LO. Version 1: optical SM splitter. Version 2:
optical PM splitter. Version 3: PBS.
503—fibre containing LO-1. Version 1: SMF. Version 2 and Version 3: PMF.
504—fibre containing LO-2. Version 1: SMF. Version 2 and Version 3: PMF.
505,506—fibre optical fused SMF 3×3 coupler
507-512—SMF
513-516—components including a SMF-PMF splice transition and/or a PC element
517-522—SMF containing the signals H-pq General Discussion As discussed above, various methods described herein relate to distributed sensing based on Optical Time Domain Reflectometry (OTDR), in which one or more interrogating pulses are injected into a sensing fibre and the backscattered light is analysed with regard to the time-of-arrival, intensity, polarization and/or phase. The general principles of OTDR are well known per se to those skilled in the art and therefore will not be discussed in any detail here.

In various embodiments, a heterodyne detection scheme is employed where the backscattered signal (B) is superposed with an optical local oscillator (LO) in a M×N coupler (e.g. in an optical coupler device or in an M×N optical hybrid coupler). Here, M is the number of inputs to the coupler and N is the number of outputs. M=>2 may be used to superpose B and LO.

Heterodyne detection comes with several benefits which, at the same time, induce drawbacks that may hinder constantly good performance of distributed sensors along the entire sensing fibre and for longer sensing distances. These trade-offs are explained in more detail in the following sections. Various embodiments provide a solution to multiple problems of heterodyne detection while keeping the benefits.

The frequencies of B and LO may be shifted/different or they may be equal. In the latter case, the detection scheme is sometimes referred to as homodyne. However, in the present specification, both options (i.e. with or without a frequency shift) are included in the term heterodyne.

The optical power of the superposition of LO and B signal can be expressed as:

$$P_H = P_{LO} + P_B + 2\sqrt{P_{LO} P_B} \cos(\phi) \cos(\theta) \quad \text{Equation (1):}$$

Where $P_{LO}$ and $P_B$ are the optical powers of the LO and the backscatter signal, respectively. The right-hand term is created by the superposition of the two input light fields and is usually the basis for distributed sensing. The arguments of the cosine functions are the phase difference between LO and B $\phi$ (including phase shifts introduced by the optical coupler), and the angle between the two directions of polarization between LO and B $\theta$.

Some of the benefits and drawbacks of heterodyne detection will be detailed in the following paragraphs.

Polarization Diversity Detection

The heterodyne signal is inherently sensitive to the relative angle of polarization $\theta$ between B and LO. During the superposition, only signal components which are parallel polarized can be detected. This fact facilitates Polarization-OTDR where a disturbance to the sensing fibre detected because it locally changes the birefringence in the fibre and thereby alters the SOP of the backscattered light. However, this scheme imposes a critical problem called Polarization Fading that often occurs in prior art.

Due to naturally occurring strain-induced birefringence the SOP of the interrogating light pulse and the backscatter light changes during the propagation through the fibre. Sections of the fibre emit backscatter light with a SOP that is nearly orthogonal to that of the LO. In these cases, information about the backscatter is lost. Polarization Fading results in sections with low signal quality or, ultimately, blind spots where no reliable measurement of environmental quantities is possible. This is especially detrimental for security applications such as border monitoring and asset protection.

In the past, this problem was tackled by performing interrogations with different initial SOPs, frequencies or phase shifts of the interrogating pulse and averaging or combining the results. This procedure, however, usually doubles the number of measurements needed for a complete characterization of the sensing fibre. If polarization fading is tackled in this way for DAS applications, the maximum detectable acoustic frequency of an external perturbation is only one fourth of the interrogation rate.

In various embodiments described herein, a polarization diversity arrangement may be implemented. Here, the backscatter signal is split into two (or more) differently polarized components which are then interfered with appropriately polarized LO signals. The multiple resulting heterodyne signals are separately detected and result in one separate backscatter signals for each polarization. For the purpose of eliminating the polarization fading, these signals may be combined to enable a seamless reconstruction of the backscatter signal from all points of the sensing fibre. This way the complete signal is captured using only a single interrogating pulse.

Phase Demodulation & Frequency Information

The superposed signal is sensitive to the phase between B and LO $\phi$, unlike the situation of a direct detection of the backscatter light. Systems that take advantage of this fact are referred to as Coherent-OTDR (C-OTDR).

DAS applications often require the frequency spectrum of the external perturbation to be correctly monitored in order to perform event alarming and categorization, or for more other detailed analysis. In most direct ODTR systems, however, only the power of the backscattered light is analysed and the phase information is lost. In contrast, the superposition with the LO in a C-OTDR enables a frequency analysis because acoustic perturbations impose a phase change to the backscatter light that is linearly dependent on magnitude and frequency of the perturbation. However, the intensity of the backscatter signal does not linearly follow the temporal evolution of the external acoustic perturbation. Due to a nonlinear transfer function between the imposed phase change and the measured signal power, the frequency information of power data is corrupted. To retrieve the correct frequency information regardless of the magnitude of the perturbation, a demodulation scheme may be implemented which outputs the original phase change of the backscattered light. This information can be used to gain the true frequency spectrum of the acoustic/vibrational event.

In order to perform a demodulation scheme, appropriate signals may be generated as described herein. Since blind spots constitute a severe problem in most applications of distributed sensing, in embodiments described here such signals are created in combination with a polarization diversity scheme.

Various implementations describe the use of one or more 3×3 optical couplers. Demodulation may be performed based on three resulting output signals instead of quadrature IQ demodulation (reference is directed to U.S. Pat. No. 9,541,425 B2). This method results in less signal fading, has no need for complicated fringe-counting algorithms and is less sensitive to imperfections of the optical components.

As discussed above, demodulation schemes may require three signals that are shifted in phase by 120° with respect to each other. These signals may be generated by a symmetrical 3×3 coupler with a splitting ratio of 1:1:1. In particular, 3×3 couplers described here may include first, second and third outputs, wherein there is 120° phase shift between the second output and the first output, and a 120° phase shift between the second output and the third output.

Embodiments described herein which employ fused fibre couplers have performance benefits with respect to prior art scheme that use hybrid optical receivers. Since demodulation schemes may be sensitive to deviations from a 120° phase shift, a non-symmetric coupling ratio may introduce errors to the demodulated phase and, consequently, the frequency information may become corrupted. Hybrid optical receivers usually offer only a typical deviation of ±10° from the ideal phase shifts. In addition, fused SM 3×3 fibre couplers offer <1° deviation from the ideal 120° phase shift, leading to good performance in demodulation.

Suppression of Laser Noise

Heterodyne detection boosts the usually weak backscatter signal by a factor of $\sqrt{P_{LO}}$ without the need for electrical amplification and, thereby, often facilitates the detection of the signal with shot-noise limited performance. However, the relative intensity noise (RIN) of the LO can prevent this optimal state of performance. Since the optical power of the LO is 5 to 6 orders of magnitude higher than the optical power of the backscatter signal, the LO RIN may become the dominating source of noise and disturb the signal quality to an extend where the sought-after quantity cannot be accurately measured or events are not captured at all.

This error source becomes increasingly dominant for long sensing distances since the power of the backscattered signal $P_B$ decreases exponentially while $P_{LO}$ and the RIN remain constant. Furthermore, mathematical operations may increase the relative error introduced by RIN during the propagation of uncertainty such that, e.g., a phase demodulation algorithm is negatively affected by intensity noise.

C-OTDR schemes may require high coherence laser sources with low phase noise and frequency drift, which come with the drawback of higher RIN. See for example Xiang Zhong et al, "Influences of laser source on phase-sensitivity optical time-domain reflectometer-based distributed intrusion sensor", Applied Optics, Vol 53, Issue 21, pp. 4645-4650 (2014). Options to reduce the RIN of the laser lead to higher costs, power consumption and go along with a potential increase of the phase noise.

Efforts to reduce the RIN can also be made after the opto-electronic-conversion of optical signals by using balanced photodiodes. Two carefully adjusted and matched photodiode signals may be used for each detection channel. When compared to single-ended photoreceivers the costs of such balanced receivers are much higher and they are more sensitive to imperfections in the specifications and alignment of the electro-optical systems.

The output signals of 3×3 couplers allow the use of cheaper and more robust single-ended detection and to reduce the RIN in the digital domain of signal processing. Use of these signals to generate IQ signals with a higher RIN suppression when compared to balanced photodiodes is described in "Colorless monolithically integrated 120° downconverter", P. J. Reyes-Iglesias et al, Optics Express, Vol. 21, Issue 20, pp. 23048-23057 (2013)

Fused Couplers, SMF vs PMF

Compared to fused PM couplers, fused SM fibre couplers are cheaper, and have less loss and less deviation from ideal values (e.g. <1° deviation for 1:1:1 splitting ratio). However in SM fibre couplers, the SOP of light can change over time or during the propagation due to birefringence that is induced by bending, pressure, thermally induced deformations or vibrations. On the other hand PM fibres and couplers assure a fixed SOP of light such that the superposition of two light fields in a PM coupler happens with parallel polarization (θ=o). Using PM couplers allows a matching SOP of LO and B during the heterodyning.

CONCLUSION

As described above, various embodiments describe the combination of 3×3 fused couplers with heterodyne detection and a polarization diversity scheme to make full use of the benefits of both schemes while tackling the drawbacks, such as polarization fading and the influence of strong local oscillator (LO) relative intensity noise (RIN). Various implementations are particularly suitable for DAS applications.

In various implementations, the system is based on standard low-cost fibre-optical and electrical components that bypass the need for integrated optical hybrids and further customization. In some embodiments, SM fused 3×3 couplers may be employed. Some embodiments describe suppression of RIN in the digital domain using the outputs signals of a 3×3 coupler so as to improve DAS sensors and other distributed fibre sensors.

Many other modifications and variations will be evident to those skilled in the art, that fall within the scope of the following claims:

The invention claimed is:

1. A distributed sensing apparatus based on Optical Time Domain Reflectometry, OTDR, comprising:
   an optical source;
   an optical splitter in optical communication with the optical source, the optical splitter having first and second outputs;
   a sensing fibre in optical communication with the first output of the optical splitter;
   a combining unit arranged to combine a reference signal derived from the second output of the optical splitter with a backscattered signal derived from the sensing fibre, wherein the combining unit comprises one or more fused fibre couplers having at least three outputs; and
   a signal processing unit configured for processing information derived from the combining unit so as to provide distributed sensing data,
   wherein the combining unit comprises a polarization diversity arrangement comprising one or more polarization sensitive elements, configured to align, in the combining unit:
      the polarization of a first signal derived from the backscattered signal with that of a first signal derived from the reference signal; and
      the polarization of a second signal derived from the backscattered signal with that of a second signal derived from the reference signal.

2. The distributed sensing apparatus of claim 1, wherein the combining unit comprises first and second fused fibre couplers, wherein the polarization diversity arrangement is configured to:
- align, in the first fused fibre coupler, the polarization of the first signal derived from the backscattered signal with the first signal derived from the reference signal;
- align, in the second fused fibre coupler, the polarization of the second signal derived from the backscattered signal with the polarization of the second signal derived from the reference signal.

3. The distributed sensing apparatus of claim 2, wherein the one or more polarization sensitive elements comprise:
- a first polarization splitter comprising:
  - a first backscattered signal output for outputting the first signal derived from the backscattered signal, wherein the first backscattered signal output is in optical communication with a first input fibre of the first fused fibre coupler, and
  - a second backscattered signal output for outputting the second signal derived from the backscattered signal, wherein the second backscattered signal output is in optical communication with a first input fibre of the second fused fibre coupler, and a second polarization splitter comprising:
- a first reference signal output for outputting the first signal derived from the reference signal, wherein the first reference signal output is in optical communication with a second input fibre of the first fused fibre coupler, and
- a second reference signal output for outputting the second signal derived from the reference signal, wherein the second reference signal output is in optical communication with a second input fibre of the second fused fibre coupler.

4. The distributed sensing apparatus of claim 3, wherein the first and second polarization splitters comprise fibre optic splitters.

5. The distributed sensing apparatus of claim 3, wherein the first and second input fibres of the first fused fibre coupler and the first and second input fibres of the second fused fibre coupler are polarization-maintaining fibres.

6. The distributed sensing apparatus of claim 3, wherein:
- the first and second input fibres of the first fused fibre coupler and the first and second input fibres of the second fused fibre coupler are non-polarization-maintaining fibres;
- the first backscattered signal output of the first polarization splitter is connected to the first input fibre of the first fused fibre by a first splice transition;
- the second backscattered signal output of the first polarization splitter is connected to the first input fibre of the second fused fibre by a second splice transition;
- the first reference signal output of the second polarization splitter is connected to the second input fibre of the first fused fibre by a third splice transition, and
- the second reference signal output of the second polarization splitter is connected to second input fibre of the second fused fibre coupler by a fourth splice transition.

7. The distributed sensing apparatus of claim 6, wherein the first and second backscattered signal output and the first and second reference signal output comprise polarization-maintaining fibres.

8. The distributed sensing apparatus of claim 6, wherein the first and second fused fiber couplers comprise non-polarization-maintaining fused fiber couplers.

9. The distributed sensing apparatus of claim 6, comprising one or more polarization controllers to control the state of polarization input to at least one of the first and second fused fibre couplers.

10. The distributed sensing apparatus of claim 2, further comprising first, second and third combiners, wherein:
- the first and second fused fibre couplers each have a respective first output in optical communication with the first combiner;
- the first and second fused fibre couplers each have a respective second output in optical communication with the second combiner;
- the first and second fused fibre couplers each have a respective third output in optical communication with the second combiner.

11. The distributed sensing apparatus of claim 10, wherein the first, second and third combiners each have polarization-maintaining outputs.

12. The distributed sensing apparatus claim 1, wherein the one or more fused fibre couplers comprise one or more polarization-maintaining fused fibre couplers.

13. The distributed sensing apparatus of claim 12, wherein the one or more fused fibre couplers comprise at least three polarization-maintaining output fibres.

14. The distributed sensing apparatus of claim 1, wherein the combining unit comprises a fused fibre coupler having first and second working axes, wherein the polarization diversity arrangement is configured to:
- align the polarization of the first signal derived from the backscattered signal along the first working axis for superposition with the first signal derived from the reference signal;
- align the polarization of the second signal derived from the backscattered signal along the second working axis for superposition with the second signal derived from the reference signal.

15. The distributed sensing apparatus of claim 14, wherein said fused fibre coupler comprises a polarization-maintaining fused fibre coupler having first and second polarization-maintaining input fibres.

16. The distributed sensing apparatus of claim 15, wherein the combining unit includes an optical fibre for receiving the backscattered signal, wherein the polarization sensitive element comprise a splice connection between the optical fibre for receiving the backscattered signal and one of said first and second polarization-maintaining input fibres.

17. The distributed sensing apparatus of claim 14, comprising three output polarization beam splitters, each output polarization beam splitter being in optical communication with a respective output of said same fused fibre coupler.

18. The distributed sensing apparatus of claim 1, wherein the combining unit is configured to provide first and second signal triples, wherein:
- the first signal triple is formed by superposition of the first signal derived from the backscattered signal with the first signal derived from the reference signal; and
- the second signal triple is formed by superposition of the second signal derived from the backscattered signal with the second signal derived from the reference signal, and
- wherein the signal processing unit is configured to process information derived from the first and second signal triples so as to provide the distributed sensing data.

19. The distributed sensing apparatus of claim 1, wherein the one or more fused fibre couplers comprise non-polarization-maintaining fused fibre couplers.

20. The distributed sensing apparatus of claim 1, wherein the combining unit is formed of fibre optic components only.